Dec. 9, 1969  B. L. JORDAN ET AL  3,482,614
TREE FELLING DEVICE
Filed March 17, 1967  6 Sheets-Sheet 1

United States Patent Office 3,482,614
Patented Dec. 9, 1969

3,482,614
TREE FELLING DEVICE
Bertram L. Jordan, John D. Mitchell, Joseph J. Harrington, Charles B. Griffin, and William R. Hall, all of General Delivery, Lewiston, N.C. 27849
Filed Mar. 17, 1967, Ser. No. 623,921
Int. Cl. B65b 1/14
U.S. Cl. 144—34                    9 Claims

ABSTRACT OF THE DISCLOSURE

This invention relates to a tree felling device which includes one or more of the following novel features; (a) pair of blade guide members (b) a jaw section constructed so that it can be more easily maintain itself in planar alignment with the cutting means as it cuts through the tree (c) a jaw section that diverges in an outward direction (d) a protective bar and (e) a specially located pivot point for the tree shear blade.

BACKGROUND

The lumber and pulpwood industries require large quantities of logs each day in order to maintain continuous operation. At one time all of these logs were supplied by crews of men with axes and saws working their way through a tract of woodland. Within the last twenty years chain saws operated by small gasoline motors were introduced and this greatly reduced the actual physical labor involved in felling a tree. Although a great number of chain saws are still in use by lumbermen, the diminishing supply of labor and its increasing cost have forced the lumber and pulpwood industries to look for other means for felling trees at less cost and greater speed. The trend now clearly seems to be toward cutting devices mounted on tractors or other such vehicles, and powered by one or more hydraulic pistons. One such tractor-mounted cutting device can do the work of many men equipped with chain saws.

Devices of the above type have the advantage that (a) the tractor can move through heavy underbrush more quickly and easily than men with chain saws, (b) tree felling is less at the mercy of unfavorable weather and soil conditions, (c) the comparatively delicate and erratic performance of chain saws is avoided, and (d) the movement of the tractor through a wooded area in the normal course of its tree felling operations automatically smooths the way for subsequent log removing operations by crushing down the heavy underbrush which often surrounds the trees.

Since the basic idea of mounting hydraulically driven shears on a tractor and using it to cut down trees is now about thirty years old (see Knight Patent 2,214,334), the inventors in this field have primarily directed their attention toward solving certain problems associated with this basic operation.

It is therefore one object of this invention to provide a tree cutter that is both rugged and reliable in operation under a wide range of adverse working conditions. Another object of this invention is to provide a tree cutter that will require less maintenance and easier maintenance than prior tree cutters. A further object of this invention is to provide a timber shears device that will not "back" the tractor away from the tree during the shearing operation. Another object of this invention is to provide a novel means for guiding the blade with respect to the jaws during the cutting operation. An additional object of the invention is to provide a novel jaw face construction which will minimize the possibility of damage to the blade when it is caused to move in an upward direction during the tree shearing operation. Another object is to provide a wedge-type protector for the blade and an upstanding bar-type protector for the jaw assembly. A further object is to provide means for facilitating movement of the jaws over the ground.

DESCRIPTION

With the foregoing and other objects in view, all of which will become clearer as the description proceeds, the invention consists of certain novel details of construction and combinations of parts hereinafter more fully described and pointed out in the claims, it being understood that changes may be made in construction and arrangement of the parts without departing from the basic spirit and scope of the invention as claimed.

In the accompanying drawings preferred forms of the invention have been shown, in which.

Figure 11:
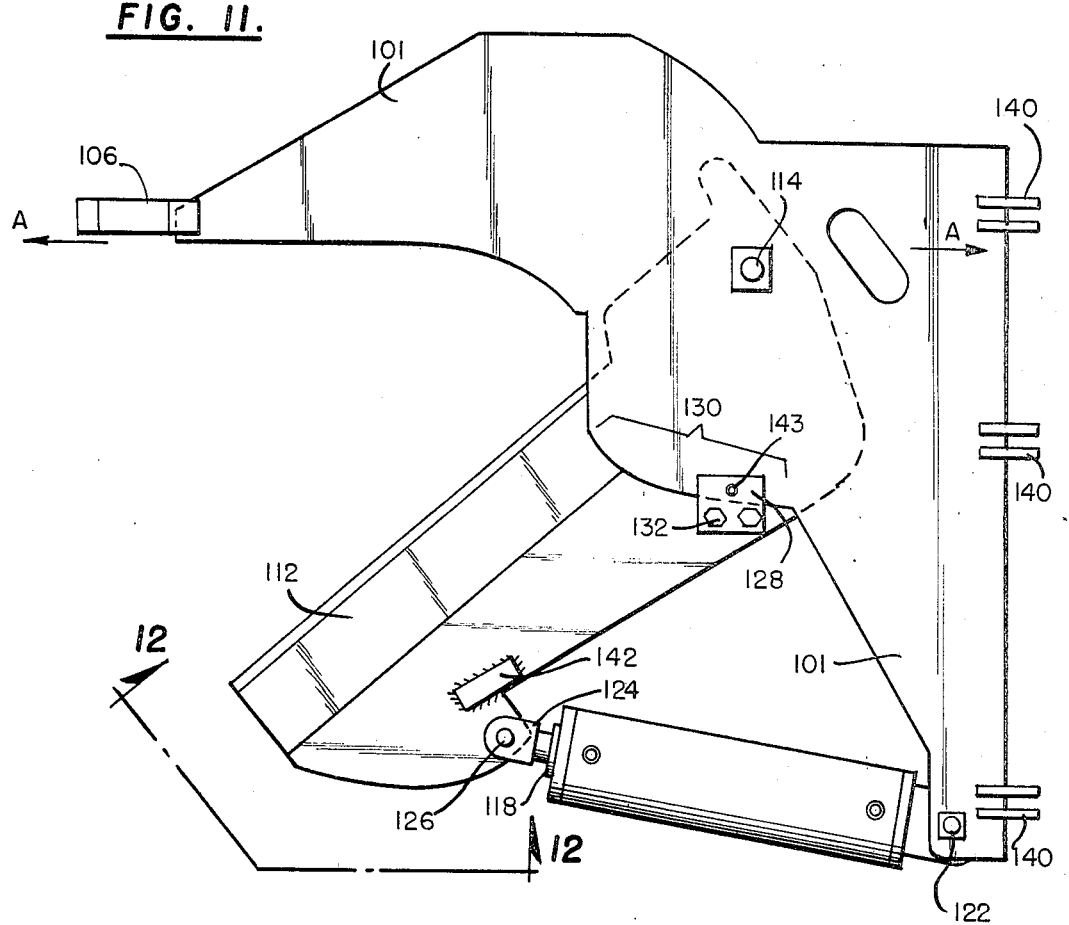
Figure 12:
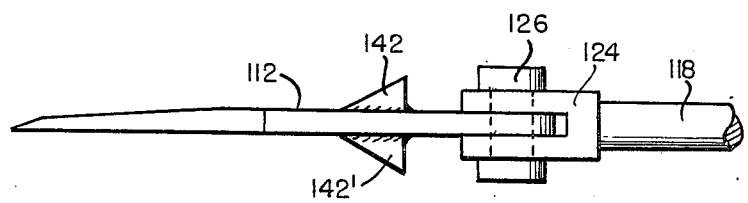

FIGURE 11 is a plan view of a jaw assembly and blade arrangement in accordance with the third embodiment of this invention and illustrating in greater detail the location of the various pivot points and the sliding path of the blade guide member; and FIGURE 12 is a view along 12—12 of the FIGURE 11, showing in greater detail the wedge member located on the back side of the blade, in accordance with the third embodiment of this invention.

Referring now to the embodiment shown in FIGURES 1–4, the timber shear device is seen to first of all include a pair of jaw members comprising an upper jaw plate 1 and a lower jaw plate 2. These two jaw plates can be in substantially parallel planes. They are preferably held in place by any suitable means (such as a plurality of spacer members 3). Each jaw plate may be provided with a plurality of teeth 21 which may aid in gripping and holding the tree during the shearing operation. However, these teeth are not necessary and in fact it is sometimes preferred not to have them, as will be described later.

In order to facilitate forward movement of the jaw member over the ground, it may be desirable to fasten (as by welding) a U-shaped or V-shaped "nose" member 14 across the forward ends of upper and lower jaw plates 1 and 2. This nose member, together with a substantially vertical end plate 22, will strengthen and protect the jaw plates 1 and 2, especially if the timber shear is accidentally driven into contact with the ground, a tree or another object.

The timber shear is preferably provided with skids 15 and 16, which can merely consist of elongated rectangular plates that are welded at right angles to the bottom of the lower jaw member 2. These skids also serve to strengthen and protect the jaw plates, as well as facilitating the forward movement of the jaw members over rocks, roots, stumps, and the like.

A plurality of strengthening ribs 17 and 18 may be secured to the top jaw member 1 at various locations by welding. Such strengthening members give the entire jaw assembly greater rigidity.

Ears 19 on top plate 1 permit the entire timber shear unit to be attached to a vehicle, such as the front end of a tractor.

A cutting blade 5 is pivotally mounted with respect to the pair of fixed jaw members by means of pivot pin 4. One or more hydraulic cylinders consisting of piston rods 7 and piston cylinders 8 extend between the back corner of the fixed jaw members (by virtue of pivot pins 9) and a bracket 6 welded to the outer end of the cutting blade 5. Pivot pins 6′ permit the cutting blade to move through a limited arc when the hydraulic cylinders are activated (by the operator).

A pair of blade guide members 10 and 10′ are mounted on the cutting blade 5. Upper blade guide member 10 is in sliding engagement with an arcuate edge section 20 of the upper surface of upper jaw plate 1 and lower blade guide member 10′ is in sliding engagement with a corresponding arcuate edge section of the lower jaw plate 2.

Two bolts 11 extend through and interconnect the blade guide members 10 and 10′ and the nuts 12 are tightened enough so that the blade guide members maintain firm sliding contact against arcuate sections of the upper and lower jaw plate members.

The arcuate edge sections of the upper and lower jaw plates insure that the blade guide plates 10 and 10′ will remain in close sliding engagement with the pair of jaw members. When wear takes place and the blade guide members have too much clearance, the nuts 12 are tightened to reestablish a tight fit.

Figure 4:
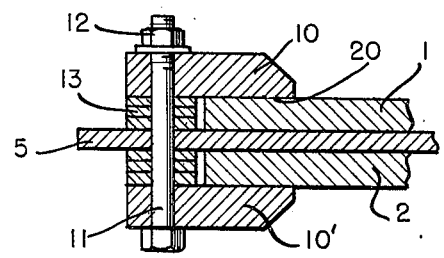
FIGURE 4 is a view similar to FIGURE 3, but with the inclusion of shims.
Figure 3:
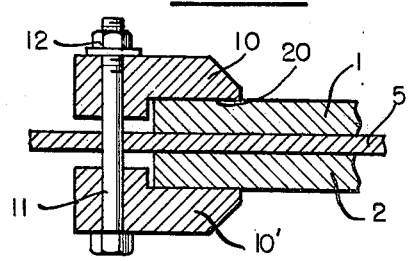
FIGURE 3 is a fragmentary sectional view of a blade and a blade guide member in accordance with this invention.

In the modification of FIGURE 4, brass shims 13 may be placed in the space between the blade guide members 10 and 10′ and the blade 5. When wear occurs and it is desired to take up clearance, one or more shims are removed and the bolts tightened again, or the worn shims replaced. It would of course not involve invention in including a grease fitting in the guide means so as to lubricate the guide means and reduce friction.

Figure 5:
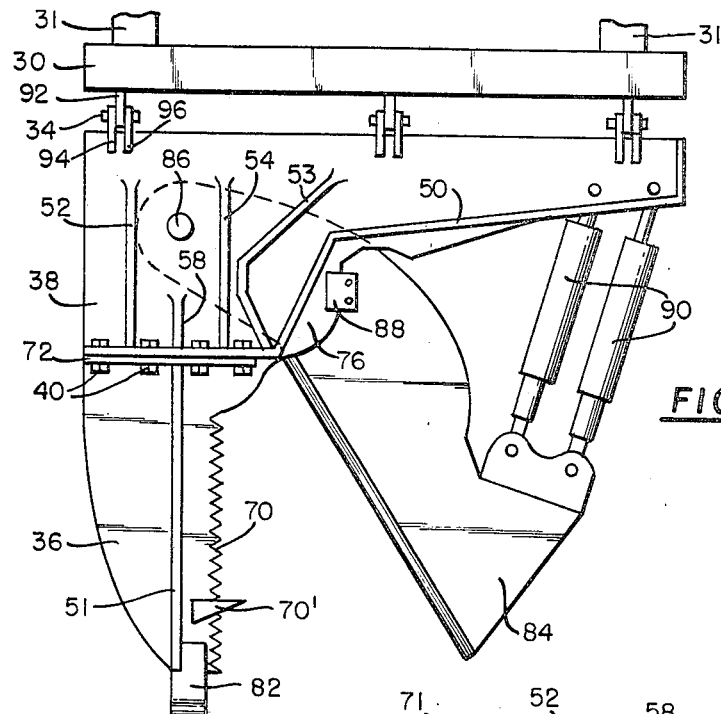
FIGURE 5 is a plan view of a further embodiment of the invention.
Figure 6:
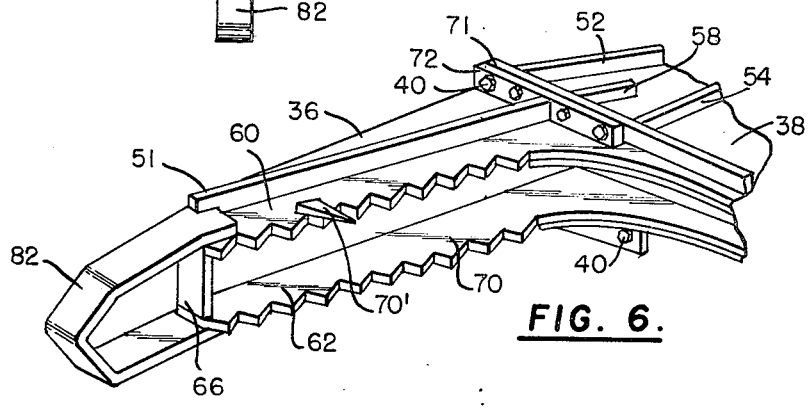
FIGURE 6 is a fragmentary perspective view showing various features of the embodiment of FIGURE 5.
Figure 7:
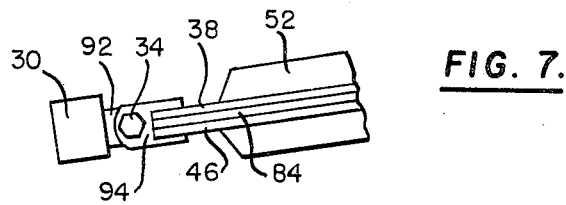
FIGURE 7 is a fragmentary side view showing further details of the hinge structure of FIGURE 5.

FIGURES 5–7 show another embodiment of this invention. Beam 30 is for connection (by means of side arms 31) to a conventional tractor. Hinge assemblies consisting of components 34, 92, 94 and 96 connect the beam 30 to the jaw member. Pistons 90 move the blade 84 about pivot pin 86 with respect to the jaw member as was described in connection with FIGURES 1–4. Blade guide members 88 function with respect to arcuate sections 76 as do blade guide members 10 in FIGURES 1–4.

In this embodiment the upper jaw plate consists of back jaw section 38 and front jaw section 36. The adjoining edges of jaw sections 38 and 36 are provided with upstanding flanges 71 and 72 respectively, which when bolted together with a plurality of bolts 40, unite the two jaw sections. Sections 36 and 38 are provided with strengthening ribs 51, 52, 58, 54, 53 and 50 that serve the same purpose and function as strengthening ribs 17 and 18 in FIGURES 1–4.

Upper front jaw section 36 has a corresponding lower front jaw section 62, which is connected thereto by means of a U-shaped nose section 82 and an end plate 66. Tusk 70 prime aids the teeth 70 in gripping the tree.

The embodiment shown in FIGURES 5–7 has the advantage that the front portion of the jaw can be replaced whenever it has received excessive abuse or damage by removing bolts 40 and holding flanges 71 and 72 together.

FIGURES 8–12 show a preferred embodiment of the invention. While this embodiment is quite similar in many respects to the embodiments shown in FIGURES 1–7, it differs in ways which make it a really exceptional timber shear device.

First of all, with regard to the similarities, the preferred embodiment in FIGURES 8–12 has a blade 112 that is pivotally mounted by means of a pivot pin 114 (see FIGURE 11) between upper and lower jaw plates 101 and 102. The blade is adapted to be moved by any suitable hydraulic actuation means. The assembly of jaw plates, blade and hydraulic cylinder is adapted to be mounted on a vehicle, such as the front end of a tractor, by means of suitable hinge means (such as 140) and support means (such as beam 136).

In the tree feeling means shown in FIGURES 8–12, it will be noted that the jaw member (consisting of the assembly of jaw plates) consists of a rather wide back section that is adapted to be hingedly attached to a vehicle, and a comparatively narrow section that is disposed forwardly of this back section, the narrow section being somewhat elongated and having one surface which is designed to press against the backside of a tree to be cut. Also, the cutting means 112 is mounted so as to permit movement toward and away from the aforesaid narrow and elongated forwardly disposed section of the jaw member, and there is a hydraulic means 120 for moving the cutting means toward and away from said narrow and elongated forwardly disposed section of the jaw member.

However, one way in which the preferred embodiment of FIGURES 8–12 differs from the other embodiments is that the space between the upper and lower jaw plates 101 and 102 has been *closed* by a vertical jaw spacer plate 104. The decision to have the jaw plates present a flat smooth wall to the blade was made contrary to the advice of skilled engineers and mechanics who had worked in developing the timber shear, for it was their thought that it would be best to leave some space between the jaw plates so that (a) the jaws could bettter grip the tree trunk, and (b) so that bark and wood chips produced during the cutting operation could pass outwardly between the jaw plates. Surprisingly, however, it was found that the use of vertical jaw spacer plate resulted in much better overall operations of the timber shear, and fewer problems. So far as is known, we are the first to ever conceive of constructing the jaws of a timber shear in this "closed" manner.

When jaw members are used that have teeth, such teeth will usually bite into the trunk of a tree and establish an essentially fixed position on the tree. However, the grain of the wood in some trees will actually cause the timber shear blade to "rise" upwardly as the blade is progressively forced through the tree, and in many instances the blade "rises" so much that the blade will actually cut into the tooth members on the upper jaw plate. This results in serious damage to the jaw plate, the blade, and also the hydraulic cylinder. By eliminating the teeth and using the vertical jaw plate 104, when the blade encounters wood grains that cause it to "rise," the jaw plate 104 is also free to "rise" since there are no teeth holding it at a fixed location in the tree.

The fixed jaws cannot ordinarily move downwardly because the jaw assembly is normally resting on the ground. Therefore, since it would be undesirable for the blade to move or "dip" downwardly, the leading edge of the blade is preferably beveled to insure that it will go through a tree in a horizontal plane or with a slight upward movement.

The use of the "smooth" face on and between the jaws was therefore clearly advantageous, but it left one problem that was sometimes troublesome. Specifically, it was found that the absence of teeth on the jaws occasionally resulted in the tractor being "pushed away" from the tree as the blade went through its cutting stroke. We discovered that this problem could be solved by locating the pivot point for the blade on the hydraulic cylinder side of the vertical plane passing through the vertical spacer plate 104. In FIGURE 11 this plane is defined by arrows A—A and can also be referred to as the "jaw face plane." The discovery that the location of the pivot point can be so important is considered to be quite unexpected. This location of the pivot point also permits a wider jaw opening and more leverage. Pivot point 114 is also preferably "behind" the front edge of blade 112.

Figure 10:
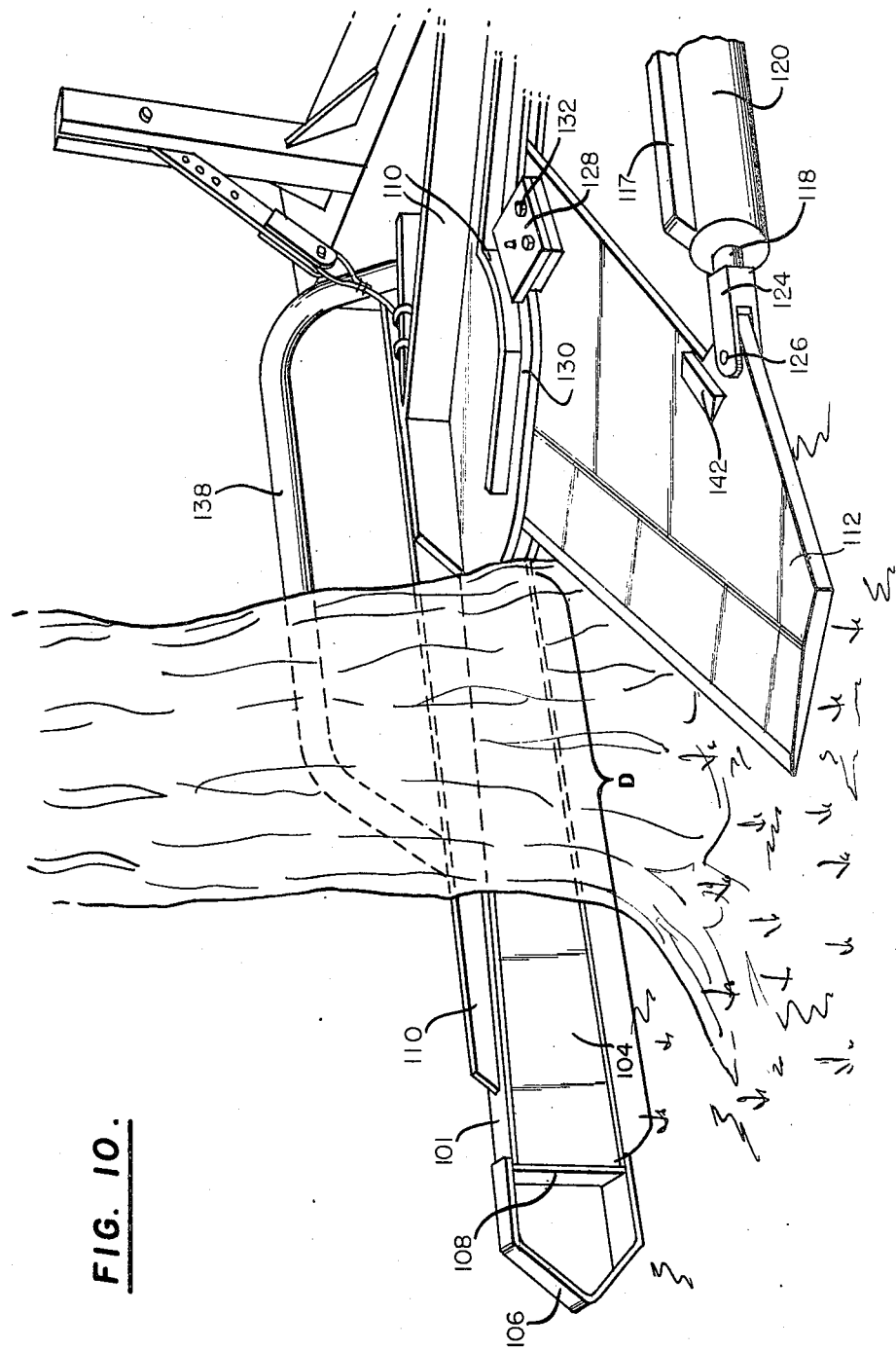
FIGURE 10 is a fragmentary perspective view of the third embodiment of our invention from a slightly different angle, showing how the jaw assembly and blade act relative to a tree trunk.

In accordance with one particular embodiment of my invention, the narrow forwardly extending section of the jaw member may diverge in an outward direction. This embodiment of my invention is best illustrated in FIGURE 10, wherein it is seen that the section of the jaw member indicated by the bracket D diverges outwardly (the word "outwardly" being used in the sense that the end of the blade to which the hydraulic cylinder 120 is attached is considered as the "outward" end of the blade). It is clear that the portion of the remainder of the jaw member (other than that indicated by the bracket D) should not diverge, for if it did it would be difficult for the blade to maintain a firm sliding contact or tight fit between the upper and lower jaw plates.

In FIGURES 8-12 it will also be noted that the backside of jaw plates 101 and 102 has been closed with a vertical plate 103. It is, of course, appreciated that both vertical plates 103 and 104 lend strength and rigidity to the jaw assembly.

End plate 108 and "nose" member 106 further strengthen and protect the jaw plates, especially if the timber shear is accidentally driven into contact with the ground, a tree, or another object.

As will be seen in FIGURE 11, the blade guide member 128 with its bolts 132 and grease fitting 143 (which is constructed in essentially the same manner as those described in connection with the first two embodiments) is adapted to slide over the arcuate edge section of the upper surface of jaw plate that has been designated with the bracket 130.

Another novel aspect of my preferred embodiment is the provision of wedge members 142 and 142' adjacent the back edge of blade 112, that are designed to protect the yoke 124 and pivot pin 126 during the cutting operation. Prior to the inclusion of such wedge members, the blade in going through a tree would not create enough space for the yoke to follow, with the result that the yoke was often snapped off. The use of one or more wedge members avoids this and also provides the positive beneficial effect of initiating the toppling of the tree in the direction of blade movement.

Figure 8:
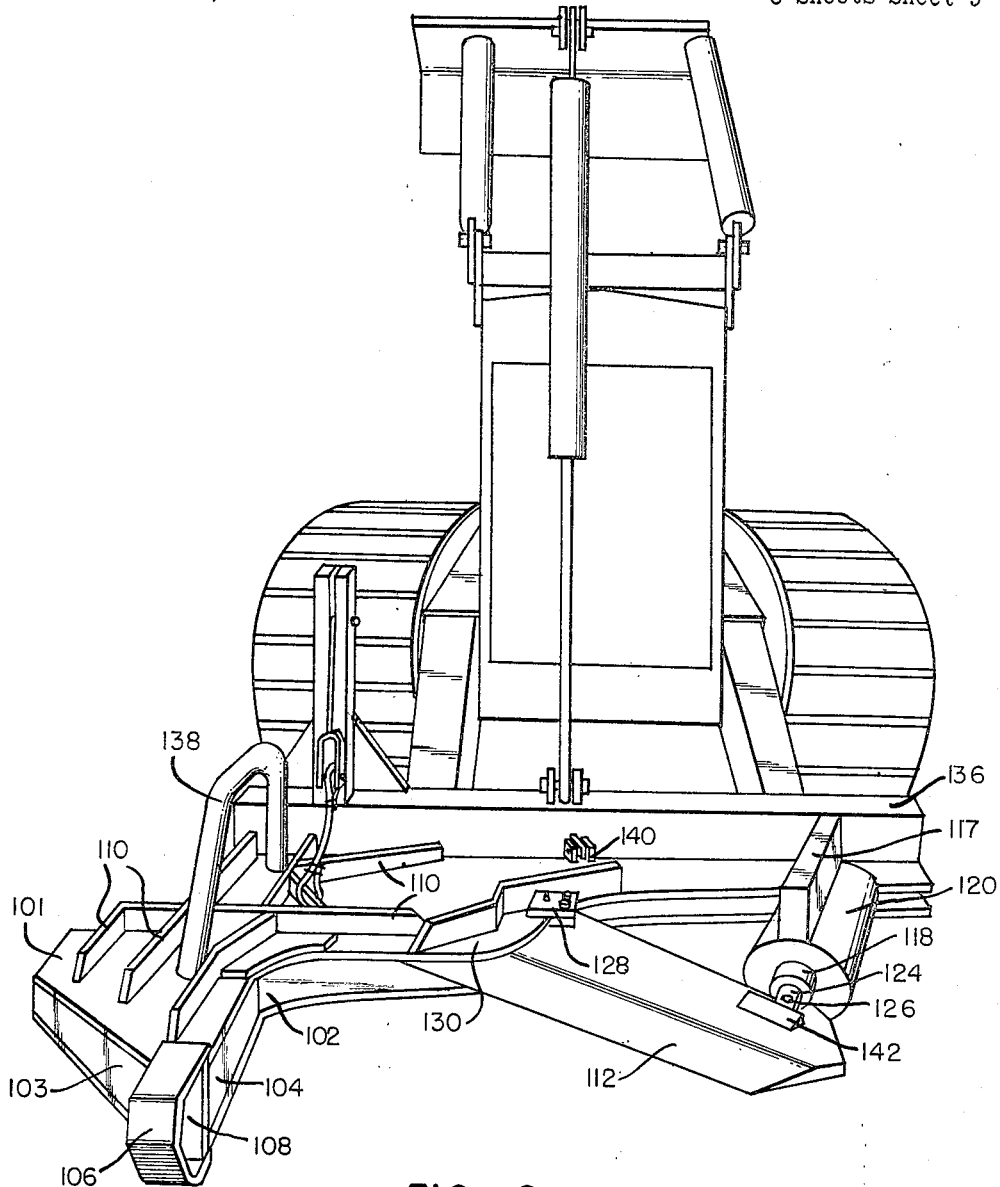
FIGURE 8 is a front perspective view of still another embodiment of our invention showing the blade of the timber shear in an open position.
Figure 9:
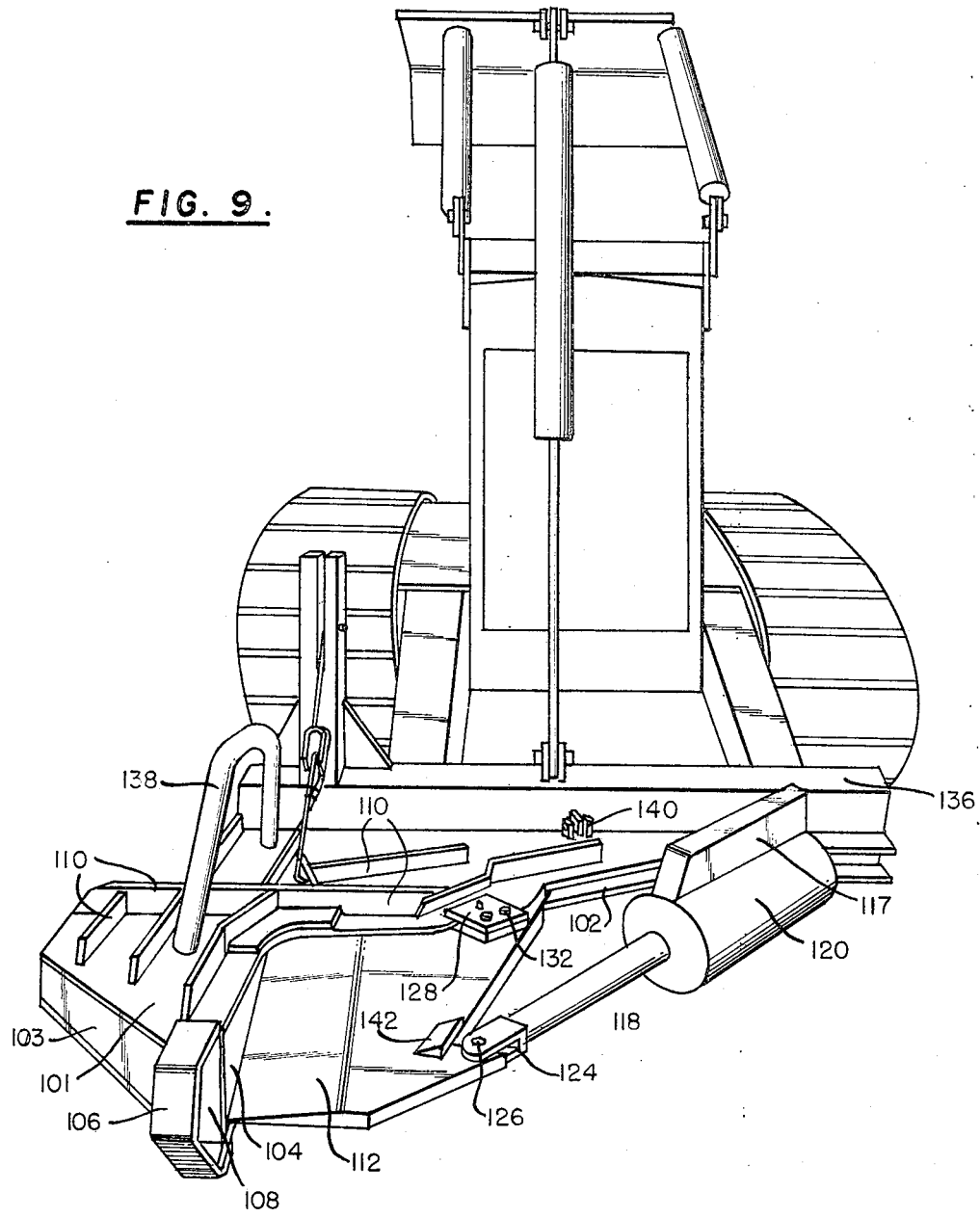
FIGURE 9 is a front perspective view similar to FIGURE 8, except that the blade is shown closed.

FIGURES 8, 9 and 10 additionally show the inclusion of a protective bar 138 which is an important practical feature of our timber shear device. In particular, it has been found that after the blade has passed completely through a tree trunk and the severed tree has actually toppled over, either the momentum of toppling or the fulcrum action occasioned by bushes or rocks located intermediate the trunk and the top of the tree will often cause the severed trunk of the tree to actually rise up several feet off the ground and then suddenly slam downwardly again. When this happens, the severed trunk can slam directly down upon the timber shear device. The provision of a protective bar 138 helps absorb some of the impact of the descending tree trunk when the prevously decribed action does occur. Although only a single protective bar has been shown, it is obvious that several could be employed.

FIGURES 8-10 also show that due to the rugged conditions under which a timber shear device must work, it is desirable to strengthen and reinforce the jaw assembly as much as possible. The plurality of strength members 110 are shown welded to various portions of the upper jaw plate 101.

Figure 1:
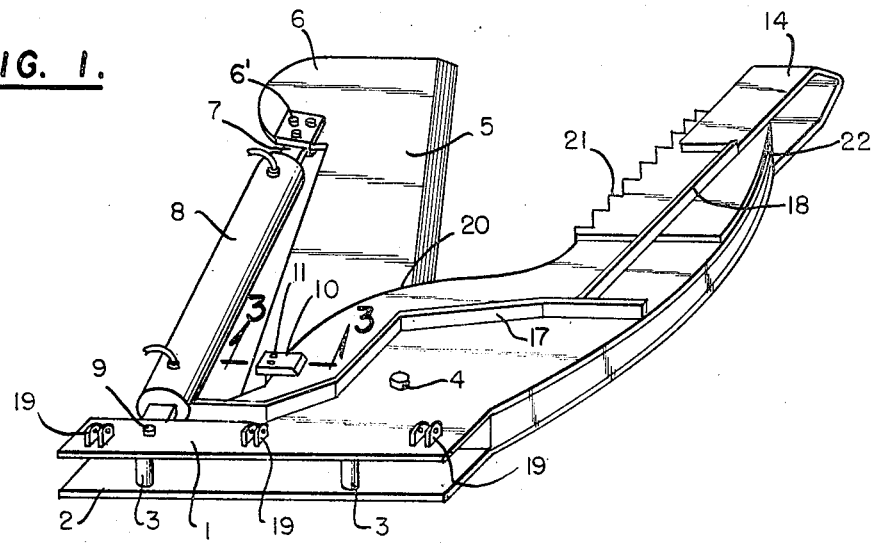
FIGURE 1 is a perspective view of a first embodiment of the invention showing the shear member from above.
Figure 2:
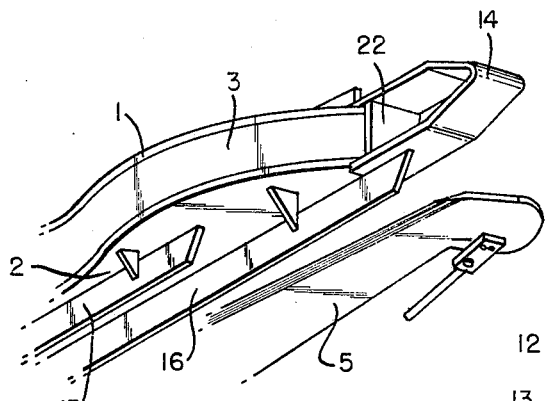
FIGURE 2 is a fragmentary perspective view taken from beneath the shear member of FIGURE 1.

Although FIGURES 8-10 do not show it, the lower jaw plate 102 may be provided with the same sort of skids that are shown in FIGURE 2 (15 and 16). As noted previously, such skids not only serve to strength the jaw plates but also facilitate the forward movement of the jaw assembly over rocks, roots, stumps and the like.

FIGURES 8-10 further show that the hose members normally connected to the hydraulic means are desirably provided with a cover 117 so as to protect them from underbrush, falling trees, etc. The hose members themselves are not shown in any of the drawings, since they are conventional.

Since the construction of the support beam 136 and its manner of connection to the tractor are not part of the present invention and since such construction is known to the art by virtue of commercial timber shear devices already on the market (e.g. Harrington Manufacturing Company's Roanoke Tree Feller, TF-1 and TF-10, line of equipment), it will not be described in detail here. Likewise, the means for raising and lowering the jaw assembly with respect to the support beam 136 does not form a part of this invention and will not be described here, since it is known to the art by virtue of the aforementioned equipment that is presently on the market.

It is thus seen that the present invention provides a hydraulically operated tree-cutting device which can easily be mounted on the front end of a crawler-type tractor and which can utilize the existing hydraulic system of the tractor for both moving the blade and positioning the blade with respect to the tree to be cut. The special way in which this cutting unit is mounted permits the operator to approach very closely to a tree and to cut off the tree cleanly at virtually ground level regardless of the incline of the ground.

While the invention has been particularly described in connection with trees, it will be understood that it is also applicable to heavy brush and foliage that are not exactly classified as trees. Also, whereas the invention has been particularly described in relation to tractors, the invention could just as well be used with a number of other types of vehicles that are not strictly characterized as tractors.

Having thus described our invention, what we now claim as new and desire to secure a United States Letters Patent on, is set forth in the following claims.

What is claimed is:

1. In a known type of tree felling device which is adapted to be mounted on a motorized vehicle and which has:
   (a) a jaw member comprising a mounting section adapted for connecting said jaw member to a vehicle and a tree-engaging section having one portion thereof which is designed to press against the backside of a tree to be cut,
   (b) a cutting means pivotally mounted to permit movement thereof toward and away from said tree-engaging section of the jaw member; and
   (c) means for moving said cutting means toward and away from said tree-engaging section of the jaw member, the improvement wherein:
   (d) said tree-engaging section of the jaw member is constructed to have a generally vertically disposed planar surface in the area where said tree-engaging section is adapted to press against the backside of a tree, said tree-engaging section being free from any horizontally extending teeth, protuberances and projections that would impede vertical sliding movement of said tree-engaging section with respect to the backside of the tree, whereby said tree-engaging jaw section is better able to remain in planar alignment with the plane of the cutting means as it cuts through a tree trunk.

2. A tree felling device according to claim 1, wherein the portion of the tree engaging section which is designed to press against the backside of a tree to be cut has a gradually increasing vertical dimension in a direction which increases outwardly with respect to the pivotal mounting for said cutting means.

3. A tree felling device according to claim 1 which additionally includes an upstanding protective means extending vertically upwards above the jaw member so as to protect at least a portion of the top of the jaw member from direct contact with falling trees.

4. A tree felling device according to claim 1 wherein the forwardmost end of said tree-engaging section is provided with a nose that is generally U-shaped.

5. A tree felling device according to claim 1 wherein the forwardmost end of said tree-engaging section is provided with a nose that is generally V-shaped.

6. In a known type of tree felling device which is adapted to be mounted on a motorized vehicle and having:
   (a) a jaw member comprising a mounting section adapted for connecting said jaw member to a vehicle and a tree-engaging section having one portion thereof which is designed to press against the backside of a tree to be cut,
   (b) a cutting means which is pivotally mounted to permit movement thereof toward and away from said tree-engaging section of the jaw member; and
   (c) means for moving said cutting means toward and away from said tree-engaging section of the jaw member,
the improvement wherein:
   (d) the portion of said tree engaging section which is designed to press against the backside of a tree to be cut has a vertical dimension which gradually increases in a direction which is outwardly with respect to the pivotal mounting for said cutting means.

7. In the known type of tree felling device which is adapted to be mounted on a motorized vehicle and which has:
   (a) a jaw member comprising a mounting section adapted for connecting said jaw member to a vehicle and a tree-engaging section having one portion thereof which is designed to press against the backside of a tree to be cut.
   (b) cutting means having a frontal cutting surface adapted to progressively penetrate the trunk of a tree, said cutting means being mounted so as to permit movement of said frontal cutting surface toward and away from the tree-engaging section of said jaw member, and
   (c) means for moving said cutting means toward and away from the tree-engaging section of said jaw member,
the improvement wherein:
   (d) said cutting means being provided with a vertically tapered wedge member spaced rearwardly of said frontal cutting surface of said cutting means, said wedge member having a gradually increasing vertical dimension, the shortest vertical dimension of said vertically tapered wedge member being disposed closer to the frontal cutting surface of said cutting member than the highest vertical dimension of said vertically tapered wedge member.

8. In the known type of tree felling device comprising in combination:
   (a) a jaw member comprising an upper jaw plate and a lower jaw plate,
   (b) a cutting means which is pivotally mounted between said pair of jaw plates so that the cutting means can be moved for a limited distance in a plane which would normally extend between the planes defined by said upper jaw plate and said lower jaw plate, and
   (c) means for moving said cutting means toward and away from a tree-engaging section of the jaw member,
the improvement which comprises:
   (d) a pair of guide members mounted on said cutting means, one of said guide members slidably engaging an arcuate section of the upper surface of said upper jaw plate and the other of said guide members slidably engaging an arcuate section of the lower surface of said lower jaw plate.

9. A tree felling device according to claim 1 wherein the pivot point for said cutting means is located on the hydraulic cylinder side of the vertical plane that passes through the jaw face plane.

References Cited
UNITED STATES PATENTS

| | | | |
|---|---|---|---|
| 3,415,296 | 12/1968 | Frankenberg et al. | 144—34 |
| 3,183,953 | 5/1965 | MacMillan et al. | 144—34 |
| 3,196,911 | 7/1965 | Busch et al. | 144—34 |
| 3,230,988 | 1/1966 | Dixon | 144—34 |
| 3,269,437 | 8/1966 | Busch | 144—34 |
| 3,327,745 | 6/1967 | Meece et al. | 144—34 |
| 3,348,592 | 10/1967 | Winblad et al. | 144—3 |

FRANCIS S. HUSAR, Primary Examiner